Nov. 28, 1933.  L. A. KOCH, JR  1,936,982
GROUND CONNECTION
Filed Dec. 10, 1931
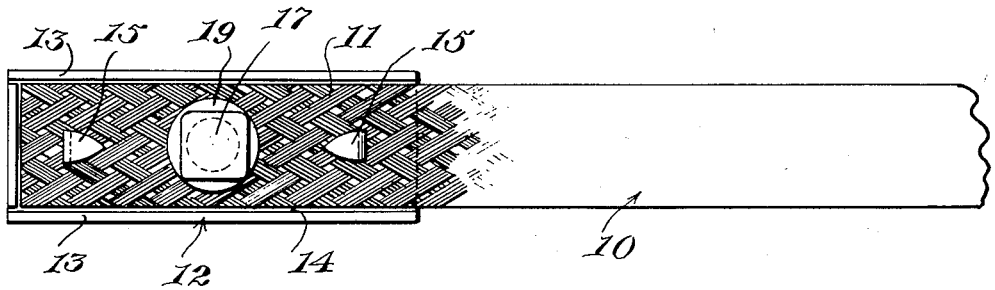
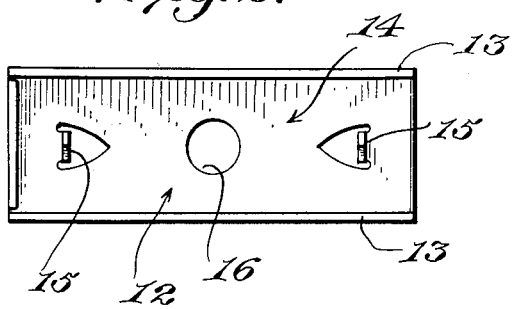
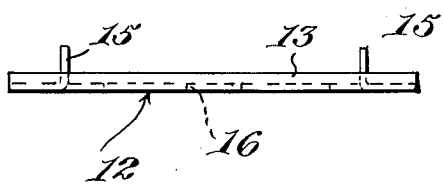
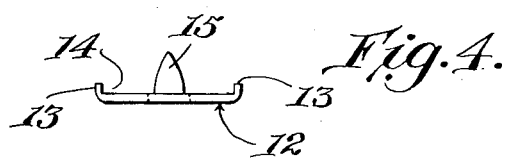
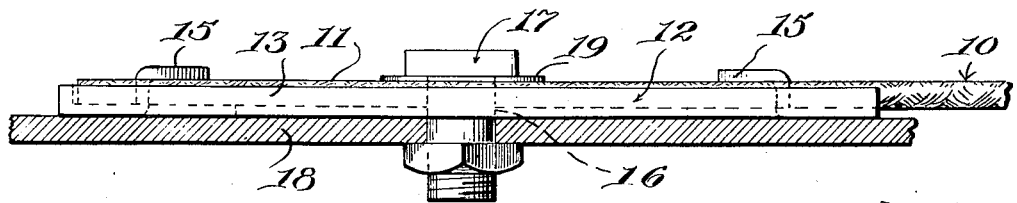
Inventor
Louis A. Koch, Jr.
Henry T. Right
By
Attorney Patented Nov. 28, 1933

1,936,982

UNITED STATES PATENT OFFICE 1,936,982

GROUND CONNECTION

Louis A. Koch, Jr., Louisville, Ky.

Application December 10, 1931
Serial No. 580,148

1 Claim. (Cl. 173—269)

My invention relates to ground connections and refers more particularly to a new and improved ground connection or contactor for use with ribbon type cable or like conductors in the battery ground circuit of automobiles.

The principal object of my invention is to provide a ground connection or contactor which is simple and inexpensive in construction and which insures a better contact between the conductor and the ground than is possible in similar previously known constructions. My improved device constitutes essentially a metallic element permanently attached to the ground end of the conductor cable and provides an increased contacting surface for connection to the ground of an automobile frame. Such frames are made of steel and the difference in electrical conductivity between the same and the contactor has always presented a difficult problem in automobile ground connections. My new connection provides for a larger area of contact thus offering less resistance and providing for a better flow of current from the battery to the steel frame or chassis of the automobile. To the accomplishment of the foregoing related ends, said invention, then, consists of the means hereinafter fully described and particularly pointed out in the claim.

The annexed drawing and the following description set forth in detail certain mechanism embodying the invention, such disclosed means constituting, however, but one of the various mechanical forms in which the principle of the invention may be used. In said annexed drawing Figure 1 is a plan view of the present novel ground connection or contactor as attached to the end of a ribbon cable conductor;

Figure 2 is a plan view of the ground connection or contactor of Figure 1 without the cable;

Figure 3 is a side elevational view of Figure 2;

Figure 4 is an end elevation thereof; and

Figure 5 is a view in side elevation of the contactor mounted in use.

In the foregoing it has been stated that the present invention relates to a contactor or connecting device for use in the ground circuit of automobiles and in the drawing I have illustrated only in connection with the present device the ordinary ribbon cable conductor which is adapted to have one of its ends connected by a split ring clip or the like to the battery, these last named elements being of ordinary construction and accordingly not being shown. In Figure 5 I have shown a fragmentary portion of the automobile frame or chassis in order to adequately illustrate the mode of attachment of the present connection. There are many known methods of connecting the ground end of the cable 10 to the automobile chassis, many of which fail in their function because of cheapness in construction and others being prohibitive because of the cost. My improved connection, which is designed to be permanently attached to the ground end 11 of the cable 10, is not only simple and inexpensive in construction, but provides an enlarged contacting surface for direct engagement with the steel frame of the automobile. This particular point may not be too strongly emphasized in that the difference in conductivity between the conductor and the steel frame is considerable and it is very desirable that the contactor be of sufficient magnitude or carrying capacity to more or less balance this difference.

As best seen in the several detailed figures of the drawing my contactor comprises an elongated flat metallic plate 12 of shallow channel cross-section having the raised sides 13 along the longest dimension of the plate 12. The recessed portion 14 thus provided by the plate 12 and raised side edges 13 is designed to accommodate or receive therein the end 11 of cable 10, the sidewise dimension of such cable fitting closely between the flanges 13.

Means integral with the plate 12 are also provided to permanently secure the end 11 of the cable thereto and these means in the illustrated embodiment comprise a pair of raised prongs 15 which are pointed at their outer end and serve to pierce the material of the cable when the latter is placed upon the plate 12. These prongs are thereafter hammered or bent parallel to the plate 12 and confine the material of the cable between their underside and the top of plate 12. By making the prongs 15 pointed I am enabled to assemble the end of the cable with my connection without first providing holes in the cable, the prongs 15 serving to pierce through the cable. At 16 is indicated a hollow through the plate 12 which is intended to receive the bolt 17 for mounting the contactor in use upon the automobile frame indicated at 18 in Fig. 5. A complementary hollow is formed through the end 11 of the conductor in any suitable manner to accommodate this bolt 17. From an inspection of Figures 1 and 5 it will be also apparent that the washer 19 used under the head of bolt 17 serves also to establish further contact between the end 11 and the plate 12. The washer 19 is placed directly in contact with the strands of the cable conductor and serves to press the same tightly into engagement with the connection when the bolt 17 is tightened to fix the contactor in place on the frame 18. If desired, the end 11 of the cable conductor may be additionally anchored in the contactor through the medium of solder.

In order to more satisfactorily overcome the difference in conductivity between the conductor and the steel frame of the automobile, my present connection may be copper plated, thus increasing its conductivity and insuring an absolutely even flow of current between the connection cable conductor. Also, as has been previously stated my contactor is of sufficient size to provide a large area of contact between the same and the ground or steel frame of the vehicle.

It should also be stated that my ground connection may be firmly and successfully mounted upon the automobile frame by means of a single bolt. The aforesaid channel edges or flanges 13 of the device serve to materially strengthen the connection in its greatest dimension. These flanges also serve to prevent any spreading of the strands of the ribbon cable in its attachment to the connection by the prongs 15 or when the bolt 17 is tightened in place. The copper plating of the contactor or ground connection itself will also aid in insuring an increase in the conductivity between it and the automobile chassis.

I claim:

In combination in a ground connection, a flat ribbon cable conductor, an elongated plate having side flanges forming a channel in which one end of the cable is received so as to overlie and contact the face of the plate between the flanges, and prongs struck from the plate, said prongs piercing the cable and being bent back upon the outer face of the latter to secure the same to the plate and said plate and cable having alined holes for the reception of a securing device.

LOUIS A. KOCH, Jr.